United States Patent

Hache et al.

[11] Patent Number: 5,500,896
[45] Date of Patent: Mar. 19, 1996

[54] CODE CONVERTER COMPRISING PROTECTION CIRCUIT

[75] Inventors: Wilfried Hache, Lehn; Jost Kawczyk, Löbau, Germany

[73] Assignee: U. S. Philips Corporation, New York, N.Y.

[21] Appl. No.: 277,445

[22] Filed: Jul. 19, 1994

[30] Foreign Application Priority Data

Aug. 19, 1993 [DE] Germany .................. 43 27 922.2

[51] Int. Cl.$^6$ .................................................. H04M 7/00
[52] U.S. Cl. .................. 379/412; 379/399; 379/413; 379/339
[58] Field of Search .................................... 379/339, 399, 379/412, 413

[56] References Cited

U.S. PATENT DOCUMENTS

| | | | |
|---|---|---|---|
| 4,359,655 | 10/1982 | Rademaker et al. | 379/399 |
| 5,046,089 | 9/1991 | Pariani et al. | 379/399 |
| 5,050,210 | 9/1991 | Dillon et al. | 379/399 |
| 5,392,349 | 2/1995 | Elder, Jr. | 379/413 |

*Primary Examiner*—Jeffery Hofsass
*Assistant Examiner*—Scott Wolinsky
*Attorney, Agent, or Firm*—Michael J. Balconi-Lamica

[57] ABSTRACT

A code converter for processing switching information signals, which comprises a protection circuit for limiting a current flowing in a telephone exchange wire. The protection circuit includes an evaluation circuit, which causes a switch arranged in series with the telephone exchange wire to open if the current, or a signal derived from the current, exceeds a threshold value. In an embodiment of the invention the current is also limited if the current assumes intolerably high values only for a brief period of time and no opening of the switch is effected.

4 Claims, 1 Drawing Sheet

CODE CONVERTER COMPRISING PROTECTION CIRCUIT

BACKGROUND OF THE INVENTION

The invention relates to a code converter for processing switching information signals, which comprises a protection circuit for limiting a current flowing in a telephone exchange wire.

The invention likewise relates to a protection circuit for a code converter.

A code converter is necessary to couple analogue switching exchanges to a PCM (Pulse Code Modulation) transmission link. The code converter converts analog switching codes (DC signals) into digital codes and is also used for converting digital codes into analog switching codes.

A code converter of this type is known from Siemens Zeitschrift 49, volume 7, pages 466–472. The telephone exchange wires i.e. the speaking wires a and b as well as the seizure wire c are connected to protection circuits (not further defined) of the code converter to protect the electronic circuits of the code converter against overvoltages and overload (see page 469). An overload or an intolerably high current level occur, for example, in the case of unintentional direct contact of the telephone exchange wires with the lines of the exchange power supply.

It is an object of the invention to provide a code converter of the type defined in the opening paragraph, which is protected against overload by a protection circuit.

SUMMARY OF THE INVENTION

This object is achieved in that the protection circuit of the code converter comprises an evaluation circuit which causes a switch arranged in series with the telephone exchange wire to open if this current or a signal derived from this current reaches a threshold value.

The arrangement according to the invention of a code converter requires an evaluation circuit and a converting means which converts the current in the exchange wire into a signal that can be processed and compare this signal with a threshold value. The circuitry and cost is minimized in an advantageous manner. The switch connected in series with the telephone exchange wire is closed and passes current if a call is to be transferred and no fault occurs. The switch is open and thus does not pass current if no call is to be transferred or if a fault occurs.

In an embodiment of the invention the evaluation circuit comprises a comparator at one input of which a threshold voltage is available and at the other input of which a voltage derived from the current in the telephone exchange wire is available.

The comparator is a simple convening means for converting a signal derived from the current in a telephone exchange wire via a comparison with a threshold voltage used as a threshold value to a voltage that can assume only two values. The two output voltage values of the comparator stand for a tolerable and an intolerably high current in the telephone exchange wire. This voltage can easily be processed.

In a further embodiment of the invention a first resistor whose voltage is available at the input of the evaluation circuit is arranged in series with the switch.

The resistor is used as a measuring resistor and converts the current flowing through it, derived from the current in the telephone exchange wire, into a voltage that can be processed more easily.

The code converter according to the invention is furthermore embodied in that a microprocessor forms part of the evaluation circuit. The microprocessor is also provided for carrying out other functions of the code converter.

With the aid of the microprocessor, which drives said switch, the function of the evaluation circuit can be easily varied. For example, with the aid of a microprocessor it is simple to provide that the switch is opened only if a fault current occurs for a period of time exceeding a minimum time interval to be determined. In this manner it is avoided that a telephone connection is interrupted as a result of a fault current that flows only very briefly. A further advantage is that a microprocessor is used which regularly forms a part of the code converter. Additional circuitry and cost due to electronic components is then not necessary.

In another embodiment of the invention a control voltage generated by the evaluation circuit is available on the series combination formed by a second resistor, a diode and a third resistor, the junction of the second resistor and the diode is coupled to the control input of the switch formed by at least a bipolar transistor, and the first resistor is arranged on the side remote from the telephone exchange wire of the switching path of the switch, and the junction of the first resistor and the switching path is coupled to the control input of the switch.

In this manner it is ensured that fault currents flowing in the telephone exchange wire even for only a brief period of time and which do not cause the switch to open and thereby cause the current flow to be interrupted, are limited as regards volume and cannot damage the electronic components of the code converter. The voltage at the input of the switch cannot reach an adjustable limit value, so that the current flowing through the first resistor and thus also the current flowing in the telephone exchange wire is limited.

BRIEF DESCRIPTION OF THE DRAWINGS

The invention will be further explained hereinafter with reference to the drawing Figures, in which.

DETAILED DESCRIPTION OF THE PREFERRED EMBODIMENTS

Figure 1:
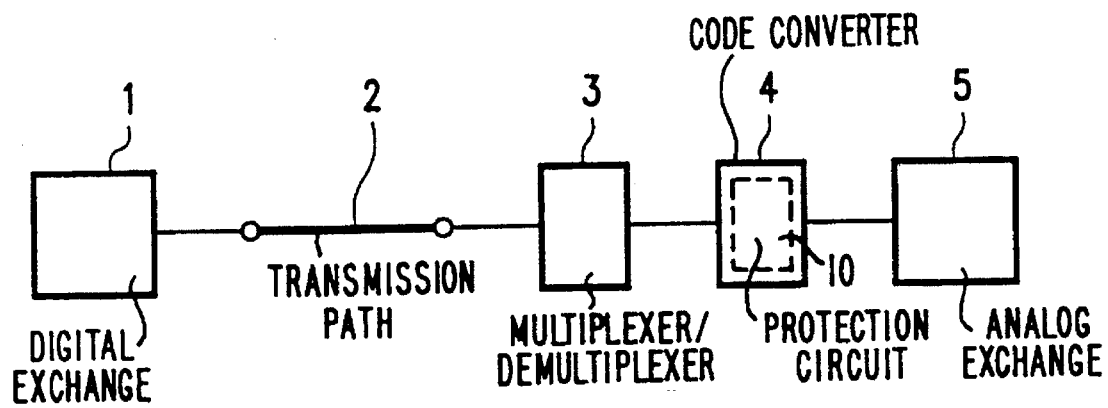
FIG. 1 shows a digital and an analog exchange with an inserted PCM transmission path 2.

In FIG. 1 is represented a digital exchange 1 which is connected to an analog exchange 5 over a PCM transmission path. The analog exchange 5 is coupled to the transmission path 2 via a code converter 4 and a multiplexer/demultiplexer 3. The code converter 4 is used, for example, for converting the digital switching code coming from the multiplexer/demultiplexer 3 to analog switching codes (DC signals) which are applied to the analog exchange 5. The digitization of the analog switching codes is likewise performed by code converter 4. The analog switching codes exchanged between the code converter 4 and the exchange 5 are DC signals. They are transmitted over the telephone exchange wires i.e. the speaking wires a and b as well as the seizure wire c. Code converter 4 includes a protection circuit 10.

Figure 2:
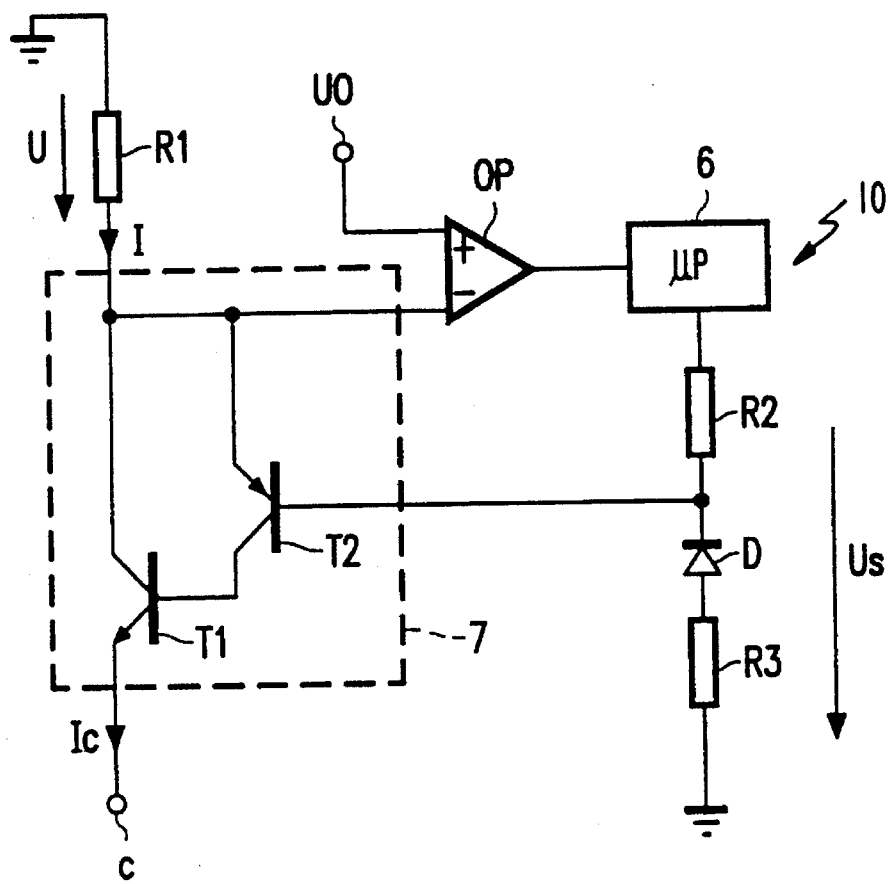
FIG. 2 shows a protection circuit of a code converter.

The circuit arrangement shown in FIG. 2 is the protection circuit 10 which is arranged in the code converter 4 and protects same against excessive currents. A switch 7 is provided comprising a complementary Darlington circuit with a first NPN transistor T1 and a second PNP transistor T2. The collector and the emitter of T1 are terminals of the controllable switch 7. The emitter of T1 is connected to a telephone exchange wire —in this case the seizure wire c. The collector of the first transistor T1 and the emitter of the second transistor T2 are connected to a resistor R1, whose other terminal is connected to ground potential (here 0 volts). The base of T1 is connected to the collector of T2, the base of T2 corresponding to the control input of the switch 7. Furthermore, the collector of T1 and the emitter of T2 coupled to this collector is connected to the inverting input of an operational amplifier OP at whose non-inverting input a threshold voltage U0 is available. The output signal of the operational amplifier OP is applied to a microprocessor 6 which serves as a central arithmetic unit of the code converter 4. The microprocessor generates with respect to the ground potential a control voltage Us which is applied to the series combination of a second resistor R2, a diode D and a third resistor R3. The resistor R2 is arranged between the output of microprocessor 6 that produces the control voltage Us and the base of the second transistor T2, which base also forms the control input of the switch 7. The series combination of diode D and the third resistor R3 is arranged between the base of T2 and ground potential while the cathode of diode D is connected to the base of T2. The diode D advantageously effects a compensation of a temperature dependence of the switch 7.

If there is no call to be transmitted, or no seizure of the telephone connection, the microprocessor 6, which in that case has no data to be processed, produces a control voltage of 0 volts. This opens the switch 7 formed by the transistors T1 and T2, and T1 and T2 are turned off. No seizure current Ic can flow into the seizure wire c. On the emitter of T1 or on the seizure wire c there is a no-load voltage available which is equal to the exchange supply voltage (–60 volts) produced by the exchange power supply.

If the telephone connection is seized, the microprocessor 6 produces a low-potential (–5 volts) control voltage. The switch 7 formed by transistors T1 and T2 is closed, i.e. T1 and T2 are turned on. Now a seizure current Ic can flow into the seizure wire c. As a result, there will also be a current I flowing through the first resistor R1, which causes a voltage drop U to occur at R1. On the emitter of the first transistor T1 there is now a potential available which is only slightly smaller than the ground potential. In the present case, about –2 volts are available.

In the case of a fault by way of example, there is an unintentional direct contact of a exchange power supply line, which carries a –60 V voltage, and the seizure wire c. On the emitter of the first transistor T1 is thus available the exchange supply voltage (–60 V) and, without a protection circuit, the seizure current Ic would increase so strongly, that destruction of the first transistor T1 would be unavoidable. But this is counteracted by the present circuit. If the seizure current Ic increases, so does the current I through the resistor R1 acting as a measuring resistor, and thus the voltage U available at resistor R1. If the voltage U available at the inverting input of operational amplifier OP exceeds the threshold voltage U0, the output voltage of the operational amplifier OP, used as a comparator, is inverted. If the voltage U is equal to the threshold voltage U0, a just tolerable seizure current Ic will flow. If the voltage level U lies above the threshold voltage level U0 for a certain period of time depending on the loadability of the first transistor T1, the microprocessor 6 no longer produces a control voltage of –5 volts, but of 0 volts. This causes the switch formed by transistors T1 and T2 to open and to interrupt the current flow into the seizure wire c. The fault is shown by a display device positioned in a plug-in module of the code converter. This plug-in module also comprises an actuation device which is regularly a component of a code converter and which is used for manually seizing again the telephone connection once the fault described above has been eliminated.

Also with the closed and thus conductive switch 7 there is a limitation of the current Ic flowing into the seizure wire c, so that even with only brief fault currents, during which the microprocessor 6 does not yet cause the switch 7 to open, a destruction of the first transistor T1 is excluded. If, as in the case of the fault described above, the exchange supply voltage is directly available on the seizure wire c (voltage drop from about –2 volts to –60 volts), this will cause the negative voltage available on the base of the second transistor T2 to drop. As the voltage on the base-emitter path of T2 (about 0.7 volt) is substantially constant, the voltage U will rise and, consequently, so will the current I through the first resistor R1, which in turn will cause the seizure current Ic to rise. However, also the base current of the second transistor T2 rises, which current is equal to the part of current I flowing away via the emitter-base path of T2. The base current of T2 flowing via the resistor R2 is in that case not negligibly small and causes a rise of the voltage on R2, an increase of the negative potential on the base of T2, respectively. This counteracts a rise of the seizure current Ic flowing away through the switch 7, so that Ic is limited. A suitable choice of the resistors R1, R2 and R3 may help ending the described limitation of the seizure current Ic.

What is claimed is:

1. A code converter for processing switching information signals, comprising a protection circuit for limiting a current flowing in a telephone exchange wire, wherein said protection circuit comprises a switch arranged in series with a telephone exchange wire for forming a switching path, said switch further having a control input;

a first resistor having a first terminal thereof arranged in series with said switch on a side remote from the telephone exchange wire along the switching path, an opposite terminal of said first resistor being connected to a ground potential, whereby the current flowing in the telephone exchange wire flows through said first resistor when said switch is closed, thereby causing a voltage, which is derived frown the current, to be developed across said first resistor;

an evaluation circuit for causing said switch to open if the current, or a voltage signal derived from the current, reaches a threshold value, wherein the evaluation circuit comprises a comparator having first and second inputs, wherein a threshold voltage is applied to the first input and the voltage developed across said first resistor is applied to the second input, the evaluation circuit further having an output for generating a control voltage with respect to the ground potential, and a series combination of a second resistor, a diode, and a third resistor connected to the evaluation circuit output, wherein a junction of the second resistor and a cathode of the diode is coupled to the control input of said switch and the series combination of the diode and the third resistor is arranged between the control input of said switch and the ground potential, whereby the diode effects a compensation of a temperature dependence of said switch.

2. The code converter as claimed in claim 1, wherein the evaluation circuit further comprises a microprocessor.

3. The code converter as claimed in claim 1, wherein said switch comprises at least a bipolar transistor.

4. A protection circuit for a code converter for processing switching information signals, to limit a current flowing in a telephone exchange wire, said protection circuit comprising:

a switch arranged in series with a telephone exchange wire for forming a switching path, said switch further having a control input;

a first resistor having a first terminal thereof arranged in series with said switch on a side remote from the telephone exchange wire along the switching path, an opposite terminal of said first resistor being connected to a ground potential, whereby the current flowing in the telephone exchange wire flows through said first resistor when said switch is closed, thereby causing a voltage, which is derived from the current, to be developed across said first resistor;

an evaluation circuit for causing said switch to open if the current, or a voltage signal derived from the current, reaches a threshold value, wherein the evaluation circuit comprises a comparator having first and second inputs, wherein a threshold voltage is applied to the first input and the voltage developed across said first resistor is applied to the second input, the evaluation circuit further having an output for generating a control voltage with respect to the ground potential, and a series combination of a second resistor, a diode, and a third resistor connected to the evaluation circuit output, wherein a junction of the second resistor and a cathode of the diode is coupled to the control input of said switch and the series combination of the diode and the third resistor is arranged between the control input of said switch and the ground potential, whereby the diode effects a compensation of a temperature dependence of said switch.

* * * * *